United States Patent [19]

Buckley

[11] 4,137,964
[45] Feb. 6, 1979

[54] CONTROLLABLE HEAT TRANSMISSION APPARATUS

[75] Inventor: Bruce S. Buckley, Cambridge, Mass.

[73] Assignee: Massachusetts Institute of Technology, Cambridge, Mass.

[21] Appl. No.: 588,093

[22] Filed: Jun. 18, 1975

Related U.S. Application Data

[63] Continuation-in-part of Ser. No. 465,377, Apr. 29, 1974, abandoned, and a continuation-in-part of Ser. No. 494,658, Aug. 9, 1974, abandoned.

[51] Int. Cl.² ............................................. F28F 23/02
[52] U.S. Cl. ........................................ 165/1; 165/32; 165/106
[58] Field of Search ................. 165/32, 106, 1; 62/338

[56] References Cited

U.S. PATENT DOCUMENTS

| 3,167,159 | 1/1965 | Bovenkerk | 165/32 X |
|---|---|---|---|
| 3,391,728 | 7/1968 | Kelly | 165/32 |
| 3,563,305 | 2/1971 | Hay | 165/106 X |
| 3,823,307 | 7/1974 | Weiss | 165/32 X |
| 3,933,198 | 1/1976 | Hara et al. | 165/32 |

FOREIGN PATENT DOCUMENTS 2006467 8/1971 Fed. Rep. of Germany ............. 165/32

*Primary Examiner*—Charles J. Myhre
*Assistant Examiner*—Sheldon Richter
*Attorney, Agent, or Firm*—Arthur A. Smith, Jr.; Robert Shaw

[57] ABSTRACT

A controllable heat-transmission device, herein called a thermic device, uses temperature changes to modulate heat flow between two regions. A fluid, in thermal contact with both regions, varies its non-radiative heat transfer in response to the temperature of either region or to a separate temperature source: both hereafter simply called the temperature source. The variation in heat transfer is due only to the thermal energy of the two regions or the temperature source; no other energy is required.

62 Claims, 31 Drawing Figures

CONTROLLABLE HEAT TRANSMISSION APPARATUS

This is a continuation-in-part of application Ser. No. 465,377 (now abandoned), filed Apr. 29, 1974 and Ser. No. 494,658, filed Aug. 9, 1974 now abandoned, and is related to co-pending application, Ser. No. 626,402, filed Oct. 28, 1975, now U.S. Pat. No. 4,050,508.

FIELD OF THE INVENTION

This invention relates to controllable heat transmission apparatus and more particularly to apparatus which uses only the heat of a temperature source to control the transmission of heat without using any other source of energy.

DESCRIPTION OF THE PRIOR ART

Previous devices for controlling heat transmission in response to a temperature relied on external power sources to provide the control of the heat flow. The temperature would actuate an intermediate interface device which would in turn control the heat flow rather than using the power associated with the heat flow being transmitted or the power of the control temperature.

Some devices have relied on modulating radiation heat transfer without using external power sources but they have not used the convention and conduction properties of fluids. Others such as variable-conductance heat pipes use a change in phase to effect heat transfer.

Previous devices have used temperature sensors with no power source but required power to modulate heat transfer. Also, devices which required no power to modulate heat transfer required power source for sensing. The device of this invention requires no power sources for sensing temperature or modulating heat transfer other than the thermal power associated with the temperature sensed or the heat modulated.

SUMMARY OF THE INVENTION

It is a primary object of this invention to provide a controllable heat-transmission panel or isolating structure, herein also called a thermic device, which uses only temperature changes to modulate heat flow between two regions. A fluid in the panel, in thermal contact with both regions, varies its non-radiative heat transfer through the panel in response to the temperature of either region or to a separate temperature source: both hereafter simply called the temperature source. The variation in heat transfer is due only to the thermal energy of the two regions or the temperature source; no other energy is required.

Thermic devices have several configurations: e.g., amplifier, summing junction, diode and gate. The amplifier changes the heat flow between the two regions proportional to a change in the temperature source. The thermic summing junction is a parallel combination of thermic amplifiers which changes the heat flow between two regions proportional to the weighted sum of several temperature sources. Amplifiers and summing junctions are the building blocks for most linear analog control systems. A thermic gate modulates the heat flow between two regions in an ON-OFF manner in response to a change in a temperature source; the gate is the building block for most digital control systems. Lastly, diodes are thermic devices which allow high heat flow between two regions if the temperature of one region is greater than that of another region but little heat flow if the reverse is true. Diodes are a basic element of non-linear control systems.

It is a further object of this invention to provide other embodiments of the invention which have the feature that heat is stored at a temperature in the liquid while in other embodiments the stored heat is provided in response to the temperature of a region to which the heat is to be transmitted.

The general substance and format of this specification do not differ in any material respect from that of the earlier applications Ser. No. 465,377 and Ser. No. 494,658; the various accompanying figures are the same as those in said Ser. No. 494,658 with some inconsequential changes, except for newly added FIG. 31 and it, as noted below, is merely a diagrammatic representation for purposes of the immediately following discussion and is intended merely to serve as a link between the various embodiments of the inventions herein. In this specification, the changes made over Ser. No. 494,658 are mostly those of language in order that the invention may be defined with even greater specificity than in the earlier applications.

Figure 31:
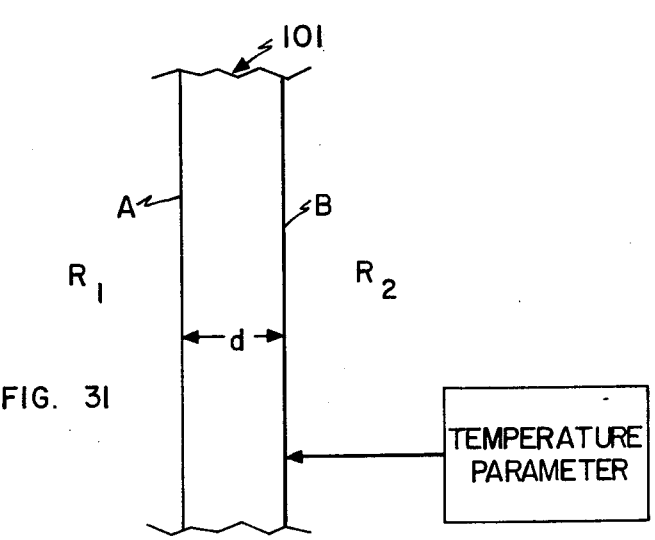
FIG. 31 is a diagrammatic representation of a thermic device disposed between and thermally isolating two, closely spaced regions from one another.

With reference now to FIG. 31 and keeping in mind that the discussion with respect thereto has general bearing on all the other figures, the present invention is directed to control heat or energy transmission between two closely-spaced regions by a panel or the like that occupies the space between the two closely-spaced regions. In FIG. 31, the two regions are indicated to be $R_1$ and $R_2$ and the isolating structure in the space between the two is marked 101. Let it be assumed for now that the region $R_2$ represents a room or chamber of some building and $R_1$ is the outside environment. The outside wall of the structure 101 is a surface A and the inside wall, that is, the wall of the room or chamber, is a surface B. Let it be assumed for now that the region $R_1$ is at a higher temperature than the region $R_2$ and that what is intended is that there be control of heat transfer between the regions $R_1$ and $R_2$. It is toward the scheme by which such control is effected that the present invention is directed and to novel apparatus to effect such control; the systems that accomplish the necessary control functions are referred to herein as thermic circuits (or thermic devices); and the thermic circuits or devices can be analog or digital, as later explained.

As above noted, the width of the space separating the regions $R_1$ and $R_2$ is not great; in fact, it equals the thickness marked d, usually six to eight inches and in no instances contemplated here would it exceed the order of a foot or so. The structure 101 in the illustrative embodiments is vertically oriented, but it suffices for present purposes that it be operated to have a vertical component of orientation. Considering the structure for now to be a black box, it is later shown that it contains a fluid medium which is adapted to flow or move within the isolating structure 101 and by virtue of such movement to affect heat transmission transversely through or across the structure 101 between the regions $R_1$ and $R_2$. In the present structure, as later shown, such movement is regulated on the basis of a temperature parameter. The temperature parameter can be a temperature differential between the regions $R_1$ and $R_2$, or it can be the temperature at either $R_1$ or $R_2$, for example. In those instances wherein the temperature parameter is the temperature differential between the regions $R_1$ and $R_2$, the energy transfer between the regions is a function of the differential and hence the temperature parameter; but more than that it is a function of the fluid flow within the isolating structure 101 and dependent solely on the convective and conductive properties of the fluid without any change of the state thereof and, most importantly, using only thermal energy. Said another way, said energy transfer is regulated on the basis of the temperature parameter, but that regulation is indirect: the direct effect occurs through the fluid itself. Furthermore, in all embodiments, fluid flow is affected by a mechanism in the system that is other than the character of the fluid itself; that is, a valving scheme or control mechanism of one type or another is employed in all embodiments to perform the regulating function, and the mechanism so used is actuated by thermal energy. The valving scheme or control mechanism in each instance provides the control function automatically through control of movement of fluid within the structure 101. By way of illustration, some of the mechanisms employed for the regulating function include: a bellows 26 in FIG. 2, the bellows 26 in FIGS. 5–8 with an insulating slab 51, the liquid valve arrangement of FIG. 13, etc. Thermics, the subject matter of this specification is discussed in an article in the *Scientific American*, a preliminary copy of which article accompanies herewith and is hereby incorporated herein by reference.

Four elemental devices are required to make analog and digital thermic circuits: amplifier, summing junction, NOR gate and diode. These various devices are now described.

Figure 1:
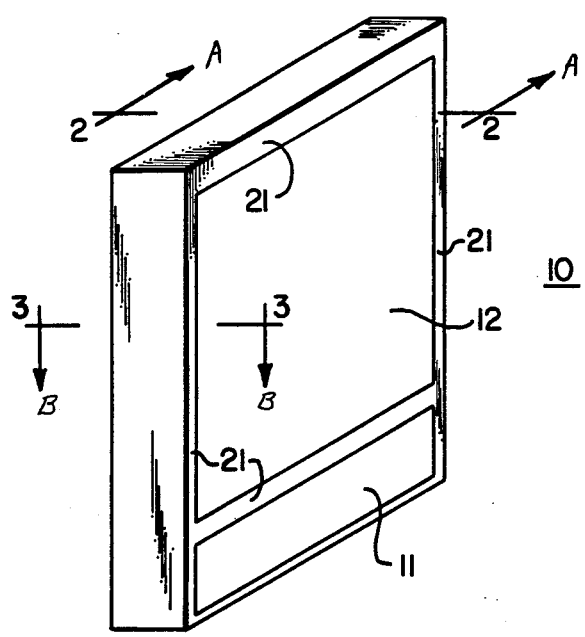
FIG. 1 is a perspective view of a film-type thermal amplifier.

An amplifier of the film type, shown in perspective in FIG. 1, is composed conceptually of two parts; the sensor 11 and the modulator 12. As hereinafter discussed, when the temperature of a liquid in the sensor 11 is raised, it vaporizes thereby forcing a heat conducting fluid into the modulator 12 to change it from a thermal insulator to a thermal conductor. The liquid stops further vaporization when the pressure in the sensor rises above the liquid's vapor pressure. The pressure rise is due to a combination of three effects: (1) compression of the gas above the conducting fluid in the modulator, (2) height of the conducting liquid sheet, (3) spring rate of the flexible diaphragm of the sensor. A very linear amplifier results if the latter two effects predominate.

Figure 2:
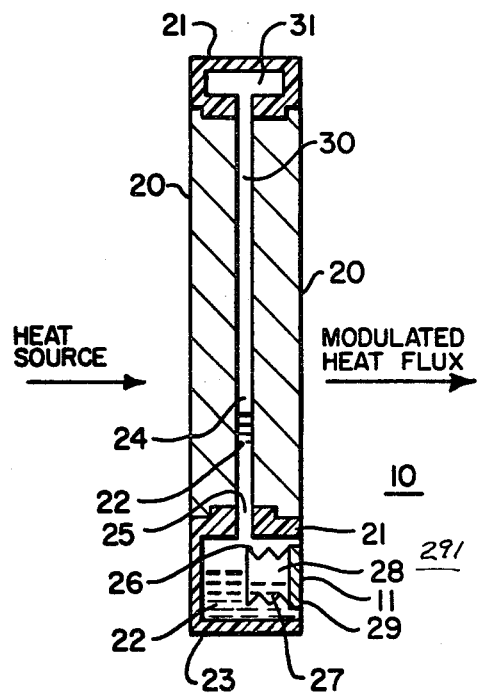
FIG. 2 is a view of section A—A of FIG. 1.

Cross-section A—A of the film amplifier panel 10 of FIG. 1 is shown in FIG. 2. Heat conducting plates 20, typically of aluminum, are held in spaced-apart relation to one another by the heat-insulating plastic frame 21. A heat-conducting liquid 22, typically water, is contained in a reservoir or chamber 23, which communicates by channel 25 with space 24 between the plates 20. The liquid 22 flows into or out-of the space 24 to the reservoir 23 in response to the displacement of liquid 22 in chamber 23 by the bellows 26.

The sensor 11 contains a vapor-tight chamber, comprising the bellows 26 and a sensing surface 29, which contains liquid 27 and its vapor 28. The sensing surface 29 is in thermal contact with the environment 291 to be sensed, the control temperature, and also in contact with the liquid 27. The liquid 27 has a vapor pressure of approximately one atmosphere at the control temperature. A typical sensor 11 has an ammonium hydroxide sensing liquid 27, a neoprene bellows 26, and a sensing surface 29 of steel. The concentration of the ammonium hydroxide in water determines the temperature at which it will have a vapor pressure near atmospheric. A Freon 11 sensing liquid in conjunction with a brass bellows 26 and brass sensing surface 29 would be useful for a sensor where the control temperature is in the vicinity of 75° F at a vapor pressure of approximately one atmosphere.

The space 24 between the plates 20 which is unoccupied by the liquid 22 contains an insulating gas 30, typically air, which in the embodiment of FIG. 2 is confined at the sides of the plates 20 by the frame 21 and at the top by the control volume 31. The size of volume 31 determines the pressure rise of the gas 30 as the liquid 22 rises from the bottom of the space 24 to the top. The greater the volume 31, the smaller will be the pressure rise in the gas 30 as it is compressed and hence the higher the gain of the amplifier 10. The gain is defined as the change in modulated heat flux for a known change in the control temperature. Higher gain is obtained by opening the control volume 31 to the atmosphere at a cost of uncertainty as to the height of the heat-conducting liquid 22 for a specific control temperature because of changes in atmospheric pressure. Consequently, there is uncertainty as to the control temperature at which the amplifier panel 10 will begin to conduct heat from the source to the other side of the panel. In any event, heat transfer from the region to the left of the panel 10 in FIG. 2 to the region 291 to the right thereof, is affected by the proportions of liquid 22 to gas 30 (i.e., the ratio of liquid to gas) in the space 24 between the two regions.

Figure 3:
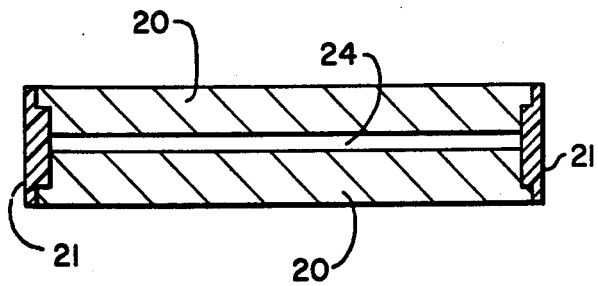
FIG. 3 is a view of section B—B of FIG. 1.

FIG. 3 shows a cross-sectional view of the panel 10 of FIG. 1 taken at section B—B which shows the sides of the frame 21 attached to the thermally conductive plates 20 to provide a container for the liquid 22.

In FIG. 2, the sensor 11 and modulator 12 are shown as one integral unit 10 since this form appears to be a preferred embodiment. However, it is apparent that the sensor and modulator may be physically removed from one another by merely elongating the channel 25, as in a pipe, while keeping the pipe full of the liquid 22 as in the channel 25.

The amplifier previously described was useful for transmitting more heat from the source to the other side of the panel 10 in response to an increase of the control temperature. A modification of the panel to cause it to act as a radiation amplifier where the heat source is replaced by a radiation source is straightforward. The conducting plates 20 are replaced by nonconducting plates of plastic or glass, and the conducting fluid 22 is replaced by a radiation-reflective fluid such as mercury. As the mercury rises in the space 24 in response to a rise in the temperature in the environment 291, more radiation is reflected from the mercury and hence less radiation energy will pass through the panel 10.

Figure 4:
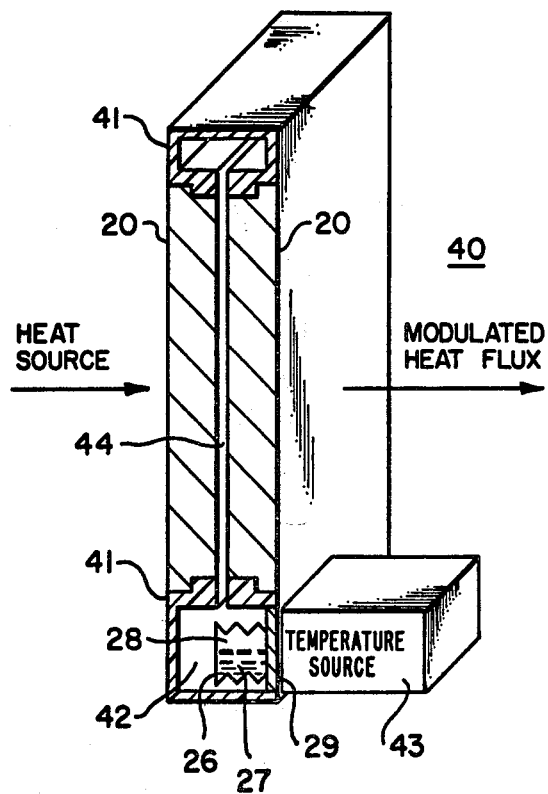
FIG. 4 is a cross-section of a perspective view of a pneumatic thermal amplifier.

Another embodiment of the invention is the pneumatic amplifier 40 of FIG. 4 shown in a cross-section corresponding to section A—A of FIG. 1. A flexible thermally nonconductive plastic frame 41 along the periphery of thermally conducting plates 20 holds them in thermal contact, thereby allowing heat from the heat source to be transmitted through panel 40 to its other side when the temperature source 43 is at a temperature where the bellows 26 is contracted. However, when the bellows 26 is expanded, as shown in FIG. 4, through an increase in the temperature of the source 43; an insulating gas 42, typically air, forces the plates 20 apart against the restraining force of the frame 41. The resultant gap 44 containing the insulating gas 42 causes the amplifier 40 to assume a nonconducting state.

Figures 5, 7:
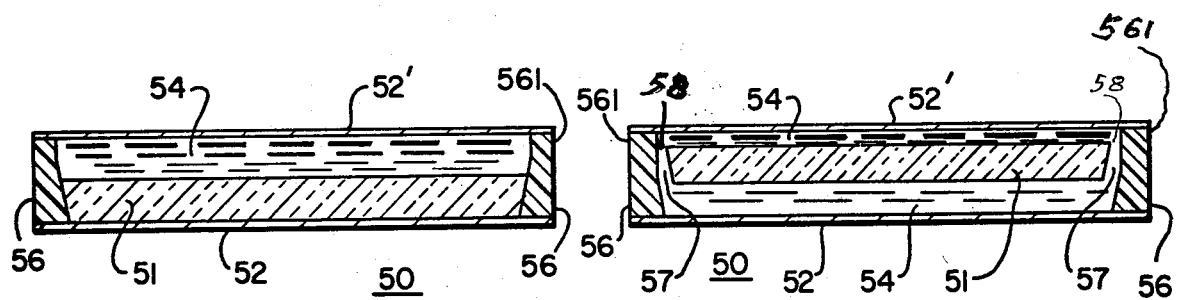
FIG. 5 is a cross-sectional view of a convection thermal amplifier in the insulating state taken along a section B—B.
FIG. 7 is a cross-sectional view of the convection amplifier of FIG. 5 in the conducting state taken along a section B—B.
Figures 6, 8:
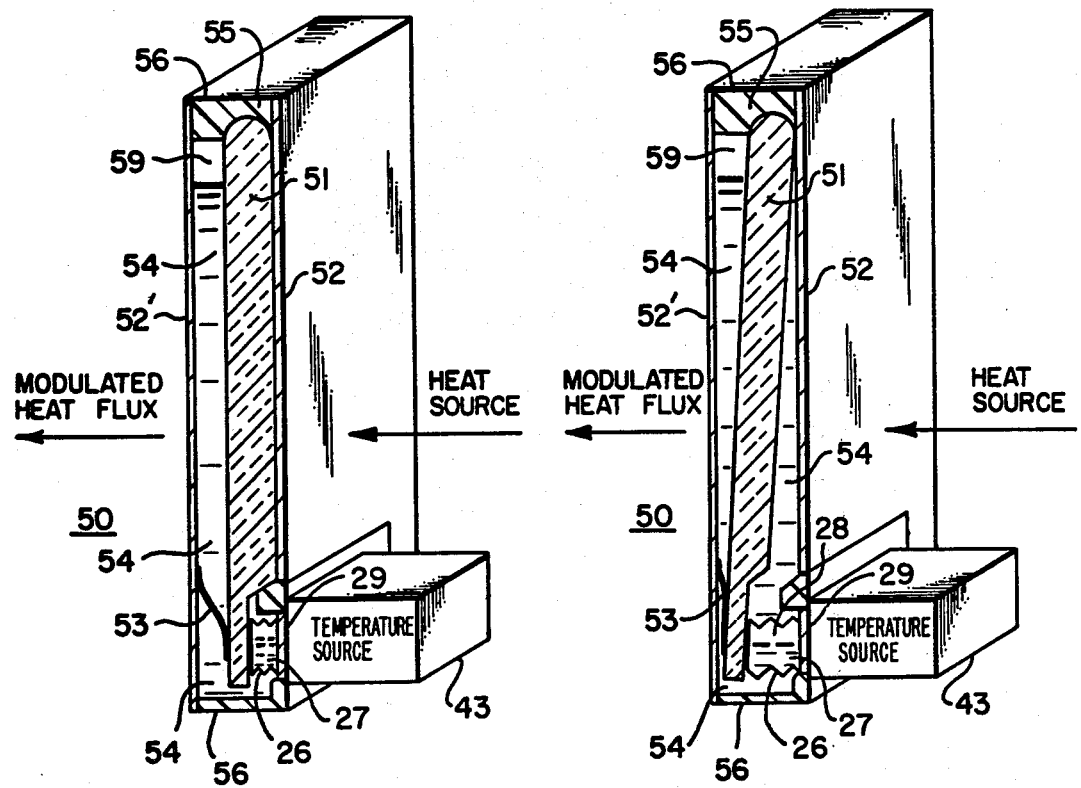
FIG. 6 is a cross-sectional of the perspective view of the amplifier of FIG. 5 taken along a section A—A.
FIG. 8 is a cross-sectional view of a perspective of the amplifier of FIG. 7 taken along a section A—A.

Another embodiment of the invention is the convection amplifier 50 shown in cross-sectional view in FIGS. 5-8 taken through sections corresponding to A—A and B—B of FIG. 1. In the insulating state, shown in FIGS. 5, 6, a rigid closed-cell foam insulating slab 51 is held in contact with one of the two heat-conducting plates 52, typically of aluminum plates, by a compression spring 53 or by the buoyancy of the foam slab 51 (where amplifier 50 is in an angled position). A heat-convecting liquid 54, typically water, and an expansion volume of gas 59, typically air, is in contact with the other conducting plate 52'. The plate 52 faces the heat source which may also serve as the source 43 of the control temperature for the sensing liquid 27 in bellows 26. When the temperature source 43 is cool, as when the sun has been obscured by a cloud or has set, the bellows 26 will be in the contracted position and the insulation 51 will be against plate 52, as shown in FIGS. 5 and 6. Little heat from the heat source will be transmitted through the panel in this position.

When the temperature of the heat source increases and it is desired to transmit the heat through panel 50, the control temperature applied to sensing liquid 27 through sensing surface 29 increases if provided by the heat source, thereby causing bellows 26 to expand as in FIG. 8. The bottom portion of insulating slab 51 is pushed away from plate 52 against the resisting force of spring 53, or the buoyancy force of the foam, by the expansion of bellows 26. The topmost portion of slab 51 is recessed into the top 55 of plastic frame 56 and remains in contact with plate 52. The sides 561 of the plastic frame 56 and the sides 57 of insulating slab 51 are tapered so that when slab 51 is removed from plate 52 as shown in FIG. 8, there is adequate space 58, as shown in FIG. 7, to allow convective circulation of liquid 54 thereby transfering heat through panel 50 from plate 52 to plate 52'.

Figure 9:
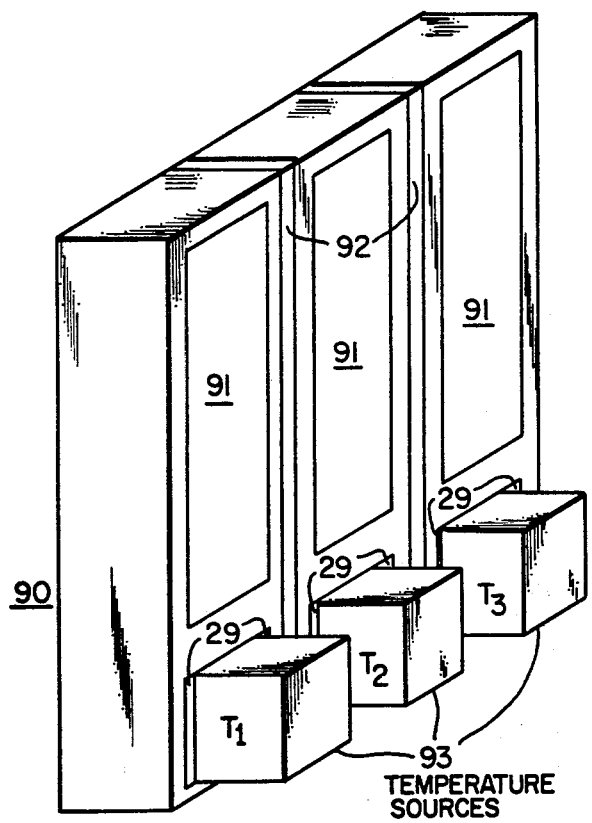
FIG. 9 is a perspective view of a thermic summing junction.

A summing junction panel 90 as in FIG. 9 can be built by paralleling panels or units 91 of the types described in FIGS. 2, 4 and 6. Each panel 91 is insulated from the neighboring panel by insulation 92. The control temperature for each panel is independent of that of the other panels and is provided by temperature sources 93 each in thermal contact with a sensing surface 29. The total heat transmitted by summing junction panel 90 is the sum of the heats transmitted by each of the panels 91 as determined by their individual control temperatures $T_1$, $T_2$ and $T_3$.

Figure 11:
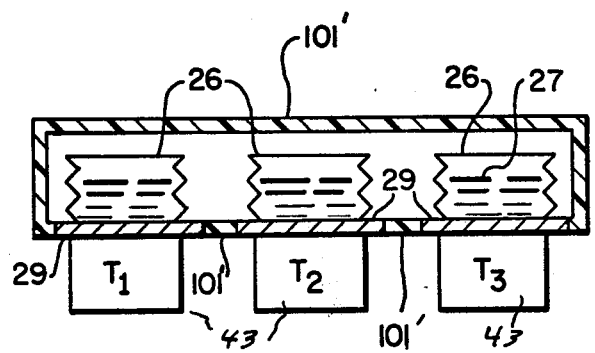
FIG. 11 is a cross-sectional view of FIG. 10 taken along section C—C.
Figure 10:
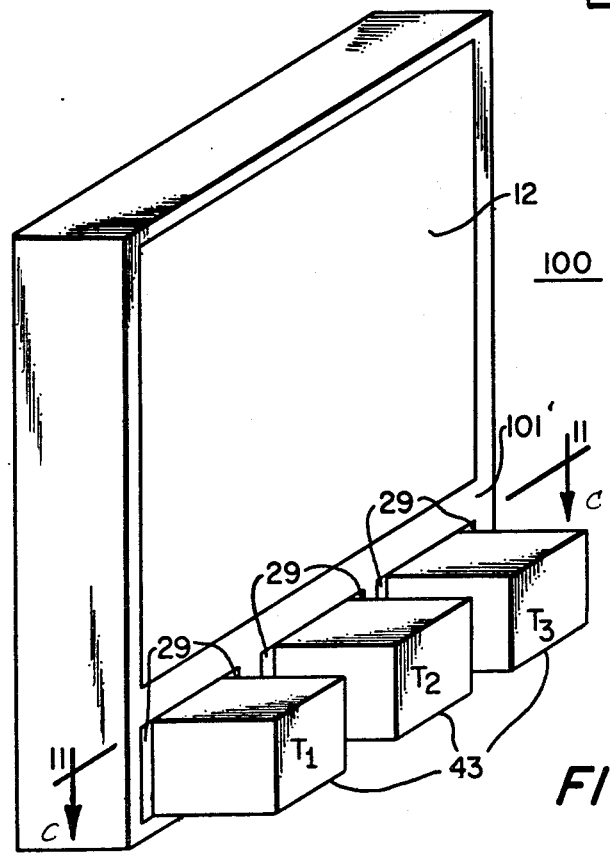
FIG. 10 is a perspective view of a thermic OR/NOR gate.

A NOR/OR gate panel 100 is shown in FIG. 10 and may be built by taking any of the panels or units of FIGS. 2, 4 and 6 and forming the sensing surface 29 to have two or more thermally isolated sensing surfaces 29 each having a flexible bellows 26 (see FIG. 11). Each surface 29 communicates with its own temperature source 43 and is thermally isolated from adjacent surfaces 29 by the plastic insulating frame 101' as shown in FIG. 11 which is section CC of FIG. 10. Each bellows 26 acts essentially independently of the others in acting upon the modulator section 12 of the panel 100 so that only one temperature source 43 can cause a change of conduction state in the modulator 12; if a hot temperature source causes the panel to conduct heat, an OR function is produced; if a hot source causes the panel to insulate, a NOR function is produced.

Figure 12:
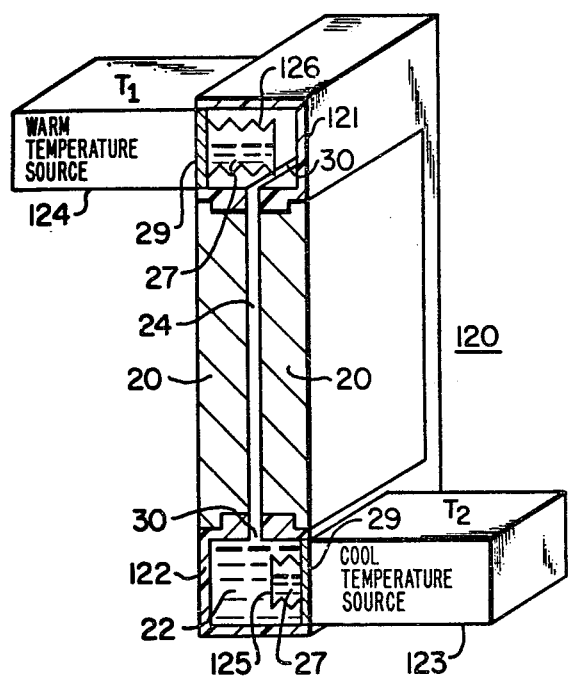
FIG. 12 is a cross-sectional perspective view of a thermic diode.

The thermic diode embodiment of this invention, shown in FIG. 12, is a modification of the panel of FIG. 2 and is a double-acting film amplifier 120 using two separate sensors 121, 122. One sensor, 122, drives the conducting liquid 22 through the space 24 between the plates 20 in response to control temperature $T_2$ of source 123. This action causes the diode panel 120 to become a thermal conductor. The other sensor, 121, drives insulating gas 30 into the space 24, thereby driving the conducting liquid 22 out of space 24 and causing diode panel 120 to become an insulator as shown in FIG. 12, in response to an increase in control temperature $T_1$ from source 124. The spring constants of the bellows 125 and 126 are chosen to offset the pressure effect of the height of heat conducting liquid 22 on the lower sensor 123. If temperature $T_2$ is greater then $T_1$, the conducting liquid 22 is driven between the diode panel plates 20 and heat can be conducted easily from the heat source to the other side of the panel. If $T_1$ is equal to or becomes greater than $T_2$, the insulating gas 30 replaces the conducting liquid 22 and heat transfer from the source to the other side of the panel is impeded. Hence, heat flow through the sheet has a preferential direction; i.e., a diode action.

If the diode of FIG. 12 is constructed of the convection type of panel 50 of FIG. 6, the sensors 121, 122 would be located at the same end of the panel 50 as the sensor of FIG. 6 but on the opposing side of the insulation slab 51. Thus, the bellows of sensor 121 would tend to push slab 51 in the direction opposite to that of bellows of sensor 122. The bellows subject to the higher temperature (assuming their pressures are equal at equal temperatures) would determine whether panel 50 was a thermal conductor or insulator. Note that there is no function for spring 53 of FIG. 6 and it would be removed in this diode embodiment.

Figure 13:
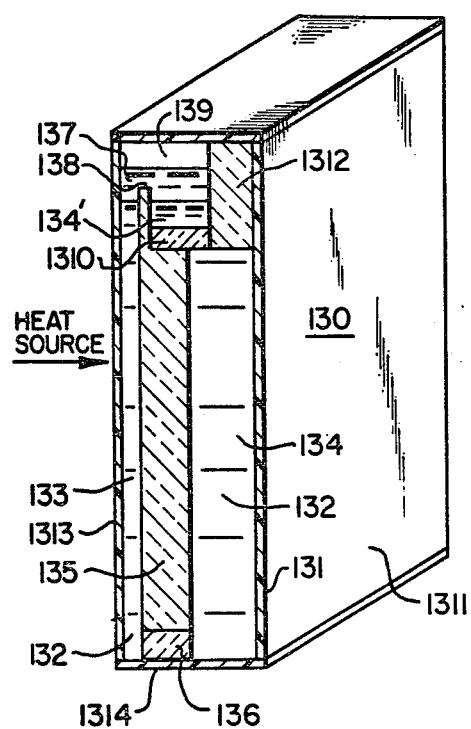
FIG. 13 is a cross-sectional perspective view of a convection solar panel.

Another embodiment of the invention is shown in a cross section in FIG. 13. The thermal panel 130 comprises a container 131 for a low viscosity liquid 132 which is suitable for convective heat transfer. Water is a suitable liquid. The liquid 132 is divided into two portions 133, 134 by a thermal insulator 135, typically a closed cell foam, which extends to the side walls (not shown) of panel 130. When the temperature of the two portions 133, 134 of the liquid 132 are the same, their heights in the panel are the same as shown in FIG. 13. If the temperature of liquid 133 is increased while that of liquid 134 is unchanged, the density of liquid 133 decreases and its height increases until it rises above the top 138 of the insulator 135 and spills over into portion 134 of the liquid thereby transferring part of the heat of liquid 133 to liquid 134. Open cell foam insulation 136, a permeable insulator, at the bottom of the insulator 135 completes the convection path from colder liquid 134 to heated liquid 133. The open cell foam insulation 136 allows convective heat transfer between liquid 134 to liquid 133 by allowing liquid flow through the foam. When no liquid is flowing through the open cell foam, the foam acts like an insulator since heat transfer occurs mostly by conduction rather than by convection. A long serpentine passage through the bottom of the closed cell foam 135 would serve the same purpose as the open cell foam 136. The open cell insulation 1310 near the top of insulator 135 provides the same insulating function as insulation 136.

The difference in the height of liquid 133 compared to the height of liquid 134 for a given temperature difference between liquid 133 and liquid 134 may be designated the sensitivity. The sensitivity of the thermic panel 130 may be increased by floating a second liquid 137, a control liquid, on the surface of the heat transferring liquid 132 thereby providing liquid valve means. The liquid 137 should have a density less than but close to that of the liquid 132 for high sensitivity and be immiscible in liquid 132. Oil, which has a density of about 0.9 that of water is a suitable liquid 137 when liquid 132 is water. The liquid 137 should extend above the topmost portion 138 of insulator 135 for maximum increse in sensitivity. The top of the liquid 137 may be open to the atomsphere or may as in FIG. 13 have an air chamber 139 between it and the closed top of panel 130 to absorb the pressure change caused by the changing volume of liquid 132 with temperature changes. Alternatively, air chamber 139 may be omitted if panel 130 is capable of withstanding the volume changes by distorting the sides 1311 of the panel 130. Also the air chambe 139 can be replaced by an internal bellows (not shown) filled with air.

If, when both liquids 133 and 134 are at the same temperature, the height of the liquids is h, the sensitivity expressed as a dimensionless change in height for the liquid 133 is given by the following equation:

$$\frac{\Delta h}{h} = \frac{\rho_2 - \rho_1}{\rho_1 + \frac{A_1}{A_2}\rho_2 - (1 + \frac{A_1}{A_2})\rho_3}$$

where $\rho_1$, $\rho_2$ and $\rho_3$ are the densities of the liquids 133, 134 and 137, respectively, (density changes with temperature) and $A_1/A_2$ is the ratio of surface areas of the liquids 133 and 134.

The unidirectionality of heat flow from liquid 133 to liquid 134 for a relative increase in temperature of liquid 133 with respect to liquid 134 is accomplished by causing the surface area of the top of liquid 134 to be much greater than that of liquid 133. For this arrangement, the change in height of liquid 133 by an amount $\Delta h$ will be accompanied by a lesser change in height of liquid 134 by the ratio of the surface areas. Thus, the level of the liquid 134 is relatively constant with changes in temperature of liquid 133. The temperature increase of liquid 134 which will cause it to transfer heat energy to liquid 133 by flowing over the top 138 of insulator 135 will be greater by a factor of the ratio of the surface areas than the temperature increase which will cause liquid 133 to flow over top 138.

The closed cell from insulation 1312 at the top of thepanel 130 reduces the conductive heat transfer heat transfer between the liquid 134' on the top of insulation 1310 and the remainder of liquid 134. In the panel 130 illustration in cross section in FIG. 13, the liquid 134 is shown having a much greater volume than that of liquid 133. This form of construction is useful for a solar energy application where the smaller volume of liquid 133 is exposed to and collects solar energy, is heated thereby to a temperature high enough to change its density and cause it to flow over insulator top 138, and thereby heat the large storage reservoir of liquid 134. Of course, if no heat storage is desired, the volume of liquid 134 could be reduced to a small amount by reducing the width of the liquid 134 region to an extent where insulator 1312 would no longer be required and wall 1311 would be contiguous with open cell insulator 1310.

The side surfaces 1311, 1313 of panel 130 are either heat conductive or radiative or both transmissive depending upon the manner of heating or cooling the liquids 133 and 134. The top 1312 and bottom 1314 are preferably thermally nonconductive as are the sides of the container 131 forming the exterior of panel 130.

This embodiment of the invention functions as a thermal diode similar to that shown in FIG. 12. When temperature of the liquid 133 is greater than that of liquid 134 heat is readily convected from liquid 133 to liquid 134; when temperature of liquid 133 is less than liquid 134 little heat is convected from liquid 134 to liquid 133. This undirectional heat flow provides a diode action.

A number of general comments can be made at this juncture, that are applicable to the embodiment of FIG. 13 and a number of further embodiments hereinafter described. The isolating structure or panel 130 in FIG. 13 is vertically oriented, but it need not be: it is necessary, however, that there be a vertical component or orientation for appropriate convection to occur. In other words, the isolating structure 130 (or other, later-described isolating structures) can be disposed at an angle such as might occur, for example, if such structure forms an inclined roof of a house or the like. In any evnt, the internal thermal insulator is impenetrable (i.e., closed cell) to the liquid at intermediate portions thereof, or at all portions thereof except its top or upper portion and its bottom or lower portion as is discussed above; hence the panel 130 is divided into a first section containing the liquid 134 and a second section containing the liquid 133. Further the upper portion or the lower portion (or both) is selectively permeable to the flow of liquid. This can be done by providing the open cell insulator 136 (which is merely a porous or permeable extension of the insulator 135) at the lower portion of the structure 130 and the liquid valve arrangement above described at the upper portion of the structure 130, the liquid valve thereby rendering said upper portion selective in permitting liquid to pass through said upper portion in convective flow between the first section and the second section of the isolating structure 130. It will be appreciated that the various porous insulators mentioned above and hereinafter at the upper end and lower end of the insulator 135 (or modifications thereof) can be considered as merely open cell extensions of the impenetrable intermediate or central portion of the insulator 135.

Figure 14:
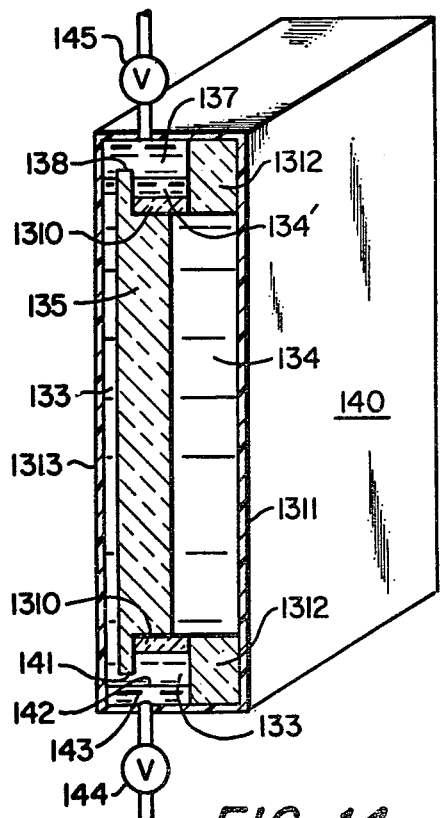
FIG. 14 is a cross-sectional perspective view of a convection panel adapted to transfer heat in either direction through the panel.

The cross-sectional view of panel 140 in FIG. 14 illustrates the manner in which the panel of FIG. 13 may be modified to be a winter-summer panel. The panel is mounted so that surface 1313 is on the outside of a building, whereas surface 1311 is on the inside of a building. In operation of the panel in the winter, the outside surface 1313 faces the sun, so that the liquid 133 behind it absorbs the radiant energy of the sun. When the temperature of liquid 133 exceeds the temperature of the liquid 134 facing the interior of the house by an amount determined by the specific design parameters of the panel, the liquid 133 will convectively flow over the top 138 of insulation 135 to thereby heat liquid 134. The panel will operate in the manner described in detail in the description of FIG. 13 if the liquid 133, 134 (when at the same temperature) is below the insulator top 138 and an immiscible liquid 137 of less density than liquid 133, 134 is above the top 138. The bottom 141 of insulation 135 is preferably above the top 142 of liquid 143, in which case there is no effect produced by the viscosity of liquid 143, which is denser than and immiscible with liquid 133, 134.

The panel 140 may also be used in the summer in a mode where liquid 133 is cooled by radiation and/or convection cooling to a night sky. If the temperature of liquid 133 is thus cooled to a temperature less than that of liquid 134 on the interior of the house, it is desired that there be convection flow of the liqiud 133, 134. For panel 140 to accomplish this, it is necessary to raise the level of liquid 143 so that it is higher than the bottom 141 of insulator 135. Valve 144 can be used to control the flow of liquid 143 from a suitable liquid source. Valve 145 is opened to drain liquid 137 out of panel 140 until the top 138 of insulator 135 is covered by liquid 133. Each winter and summer season, the panel 140 is converted to change its direction of heat flow by controlling valves 144 and 145 to drain and fill the panel 140 with the liquids 137 and 143 to get their correct levels for the desired direction of heat flow.

Figure 15:
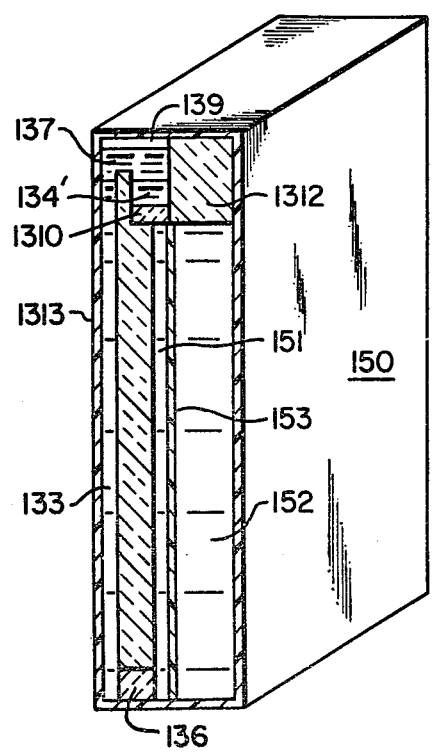
FIG. 15 is a cross-sectional perspective view of a convective solar panel with separate liquid chambers.

A reduced-cost embodiment 150 of a solar panel is shown in cross section in FIG. 15. The panel is basically the same as the solar panel of FIG. 13 except that the storage liquid 134 of FIG. 13 has been separated into a convecting liquid 151 and a storage liquid 152 by a thermally conductive separator 153. A low cost liquid such as water may be used as the storage liquid 152, whereas a glycol-water solution is used as the convecting liquid 151, 133. In this configuration, the liquid 133 when exposed to low ambient temperatures at surface 1313 will not freeze and will be considerably less expensive than a panel containing an all glycol-water solution. The liquid 152 being exposed to the interior of a house will always be above freezing temperature of water so that plain water can be used. The separator 153 can be a thin metallic sheet or a thin membrane of plastic capable of allowing heat transfer from liquid 151 to liquid 152.

Figure 16:
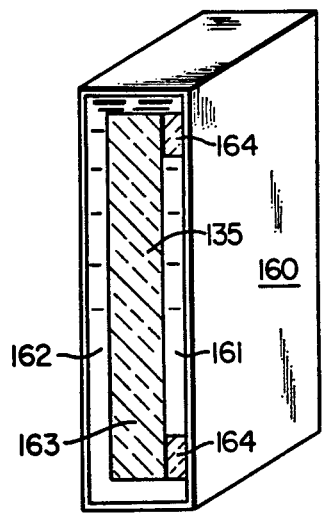
FIGS. 16-23 are cross-sectional perspective views of different embodiments of heat transfer panels.

The embodiment of FIG. 16 shows in cross section a thermic panel 160 in which heat can be transferred from liquid 161 to liquid 162 separated by insulator 163 by convection flow of the liquids. When the temperature of the liquid 161 is below its gel thickened freezing point, the liquid 161 cannot transfer heat by convection to liquid 162. When liquid 161 is frozen, congealed, thickened, or gelled, the transfer of heat by conduction to liquid 162 is reduced by placing insulation 164 between the liquids. The insulation 164 may be of the open cell foam type or of a closed cell type having passages or holes through which the liquid may pass. When the temperature of liquid 161 is above its gel or freezing point, those passages are open and a convection flow of heat from liquid 161 to liquid 162 may take place. Ordinary gelatin when mixed with water will provide a suitable gelling liquid with a melting point near room temperature. For some applications, water, which freezes at 32° F, is an appropriate liquid. If the insulator 164 is replaced by a heat conductive block with relatively small passages for the convecting liquid 161, cooling of the block to below the gel or freezing point of the liquid only will act as a control to block convenction flow of the liquid.

Figure 17:
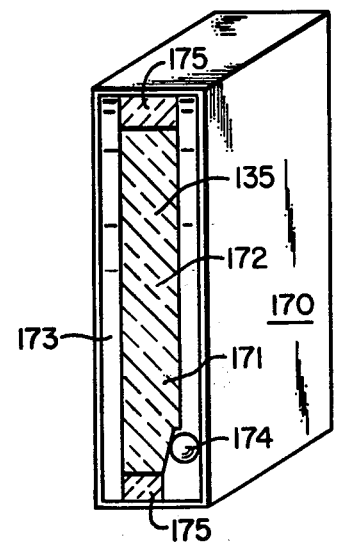

The panel 170 of the embodiment shown in cross section in FIG. 17 controls convection heat transfer by a flow control valve 171 located between liquids 172 and 173. The valve 171 comprises an insulative float 174, which may be a ball having near neutral but positive buoyancy at the temperature of the liquid in which it is immersed. As shown in FIG. 17, the float 174 is in contact with liquid 172 and separated from liquid 173 by porous or permeable insulation 175 and thus its buoyancy is affected by the temperature of liquid 172. When the density of float 174 is greater than that of hot liquid 172, the float 174 will fall, thereby opening valve 171 to convective flow from liquid 173 to liquid 172. When the density of float 174 is less than that of cold liquid 172, the float 174 rises and closes valve 171. Pressure forces of convective flow tending to keep the float 174 in a closed position are small compared to buoyancy effects. The reverse action is also possible. The float 174 can close an opening when its density is greater than that of the liquid 172. Depending on the density/temperature characteristics of the float 174, either rising and sinking with an increase in liquid temperature 172 are possible. For example, a paraffin weighted with lead foil float will rise with increasing temperature while a sealed and weighted metal container float will sink with increasing temperature. Further, the float need not be solid: certain silicone oils are liquid but perform adequately, due to their high surface tension in liquids 172 and 173.

Figure 18:
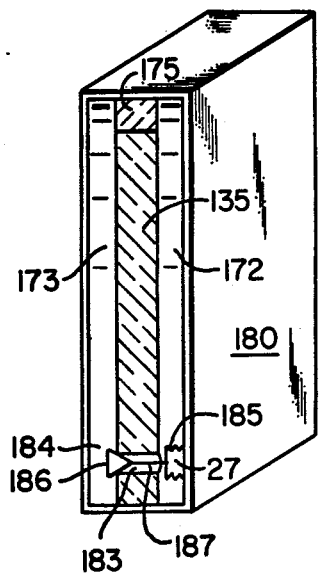

The panel 180 shown in cross section in FIG. 18 controls convective heat transfer between liquids 172 and 173 by controlling the flow of liquid through passage 183 by the action of valve 184. The valve 184 comprises a bellows 185 attached to a resilient body 186 by a rod 187. The resilient body 186, typically rubber, is forced against the passage 183 opening by the unexpanded bellows 185 to close valve 184. When the temperature of liquid 172 reaches a predetermined level, the bellows 185, which is filled with a liquid/vapor such as Freon 11, expands to push body 186 away from the opening of passage 183, thereby allowing the liquids 172, 173 to convectively circulate if the liquids are at different temperatures. It is readily seen that other types of temperature sensitive valves, such as a bimetallic strip closure of passage 183, which opens in response to the temperature of liquid 172 will also be suitable.

Figure 19:
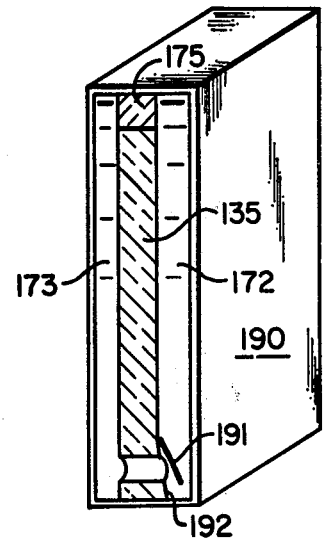

The panel 190 shown in cross section in FIG. 19 is another embodiment of a valve-controlled convective-circulation panel. A flap 191 of lightweight material, such as a thin plastic-film sheet, will open to the convection flow which will occur when the temperature of liquid 172 is higher than that of liquid 173. However, the flap 191 will close against its seat 192 when the convective flow attempts to be in the opposite direction as when liquid 173 is at a higher temperature than liquid 172. Gravity forces may be used to enhance the valve's tendency to close (i.e., flap can be inclined to vertical to give it a tendency to stay closed). Other types of one-way valves such as ball valves are also possible. This embodiment functions as a thermal diode.

Figure 20:
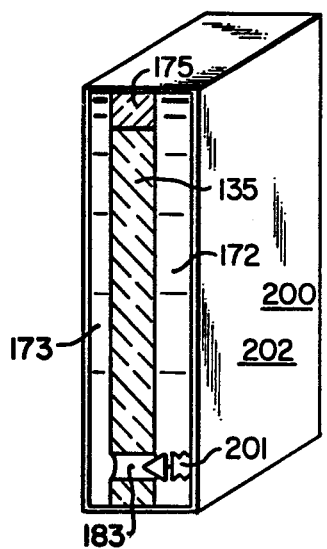

The panel 200 shown in cross section in FIG. 20 allows convection transfer of heat between liquids 173 and 172 when the temperature of liquid 172 is reduced to a temperature at which valve 201 will open flow passage 183. This embodiment acts as a controller. When the temperature of the air 202 adjacent to and in thermal contact with liquid 172 is reduced, the valve 201 causes heat to be transferred from liquid 173 heated by heat source (not shown) into liquid 172. This heat is dissipated into the air 202 adjacent to liquid 172, thereby increasing its temperature. When the temperature of controlled air is increased, the valve 201 closes reducing the heat transferred into air 202 by the heat source heating liquid 173. The temperature of the air 202 can be maintained at a near constant temperature by proper design and adjustment of valve 201.

The valve 201 may be a metal bellows filled with Freon 11 and its vapor or a vinyl or neoprene bag filled with ammonium hydroxide/water solution. The valve 201 may also be a bimetallic device adapted to open flow passage 183 when the temperature of liquid 172 is at the desired temperature.

Figure 21:
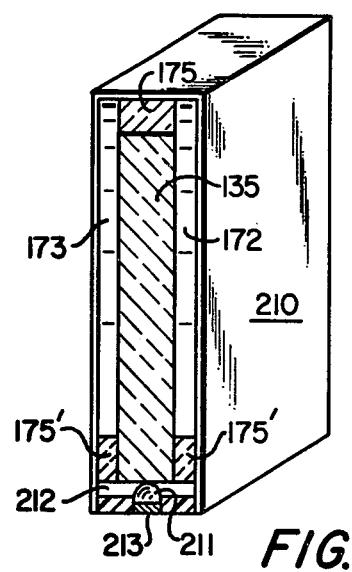

Another embodiment of a convection flow type of thermic panel is shown in cross section in FIG. 21. Panel 210 has a bubble 211 of an immiscible fluid whose size changes with temperature changes to allow or block convection flow of liquids 172, 173 because of surface tension effects in passage 212. The temperature of bubble 213 may be controlled by heat conduction through disk 213 to which a temperature source is applied. Permeable insulators 175' isolate bubble 211 from liquid 172, 173. Air or oil would be a suitable immiscible fluid 81. The bubble may have a tendency to move under influence of pressure forces caused by convection flow of liquids 172, 173. However, the bubble may be stabilized by an annulus of wire-mesh or open cell foam (neither shown).

Figure 22:
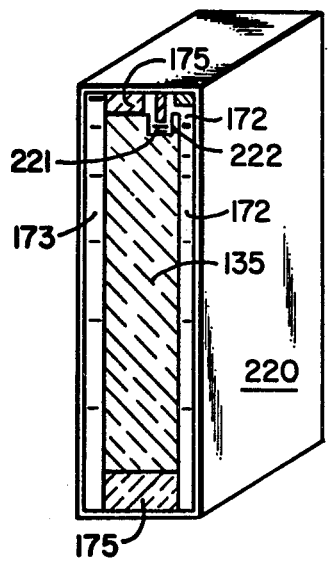

Another embodiment, panel 220 is shown in cross section in FIG. 22 where convection flow of liquids 172, 173 ceases when the state of a substance 221 in the flow path of the liquids changes from a liquid to a solid when the temperature of the liquid 172 is lowered to the solidification point of substance 221. For the configuration of FIG. 22, the substance 221 is chosen to have a density less than that of liquid 172 when in the liquid state so that it floats. A trap 222 contains the liquid 221. In the solid state, substance 221 can either float if its solid density is less than liquid 172 or can drift to the bottom of trap 222 if its solid density is greater than liquid 172. A substance 221, such as oleomargarine floats on water when liquid or solid and is suitable. For a substance whose density when liquid or solid is greater than that of water, the trap 222 is placed at the bottom of the panel to confine the material 221 and to block the flow of water when the water 172 reaches the temperature of the melting point of material 221. Dense waxes are suitable materials 221.

Figure 23:
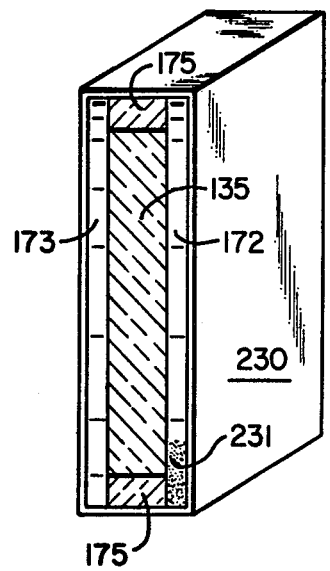

Another convective flow panel 230 is shown in cross section in FIG. 23 where the liquid 172, 173 contains a precipitate 23 which settles out when the temperature of the liquid rises to the precipitation temperature. The precipitate 231 blocks the convective flow of liquids 172, 173 until the liquid 172 cools sufficiently to absorb the precipitate. A suitable liquid 172, 173 is molten hydrated salt $Na_2SO_4 \cdot 10H_2O$ which precipitates out a salt $Na_2SO_4$ when the temperature of the liquid is above 88° F.

Figure 24:
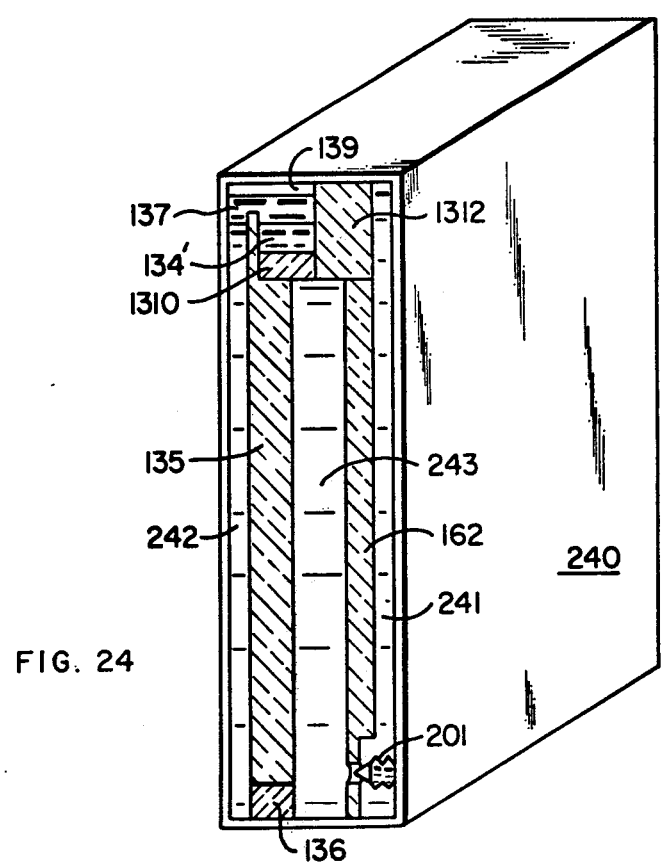
FIG. 24 is a cross-sectional perspective view of a combined thermic diode and controller.

The panel 240 shown in cross section in FIG. 24 is a solar panel which combines the diode function of FIG. 13 with the controller function of FIG. 20 to provide a source of heat from liquid 241 whose temperature is controlled. The liquid 242 is exposed to the radiant energy of the sun and heated thereby. When the temperature of liquid 242 sufficiently exceeds that of liquid 243, convection circulation of liquid 242, 243 will occur and liquid 243 will possibly become very hot depending upon the sun's energy. If it is desired to modulate the high temperature of liquid 243 to provide a lower temperature suitable for heating a room, the convection flow of liquid 243 to liquid 241 will be controlled by a temperature of liquid 241 which acts to open and close valve 201.

The unidirectionality of heat flow from the sensor liquid 133 to the storage liquid 134 of the panel of FIG. 13 is achieved by causing the area of liquid 133 to be less than that of liquid 134 at the interface of these liquids with the oil 137. Thus the panel of FIG. 13 provides a winter source of heat since the sensor liquid 133 is exposed to the sun's energy and the storage liquid 134 faces the interior of a structure. It is apparent from the explanation of the operation of the panel of FIG. 13 that the panel can instead transfer heat from a hotter storage liquid 134 to a colder sensor liquid 133 if the ratio of their surface areas is reversed by moving the topmost portion 138 of insulator 135 so that it is at the right-hand edge of insulator 135 instead of at the left-hand edge as shown in FIG. 13. With this change, the panel of FIG. 13 becomes a "summer" panel which cools the interior of the structure during the day by absorbing heat from the interior into the storage liquid 134. The diode action of the panel insulates the interior from solar heat input to sensor liquid 133, which causes liquid 133 to become much hotter than the cool storage liquid 134. Radiation cooling to the night sky of the sensor liquid 133 cools it below the temperature of liquid 134 to result in convection flow of liquids 133, 134 to thereby cool liquid 134.

Figure 25:
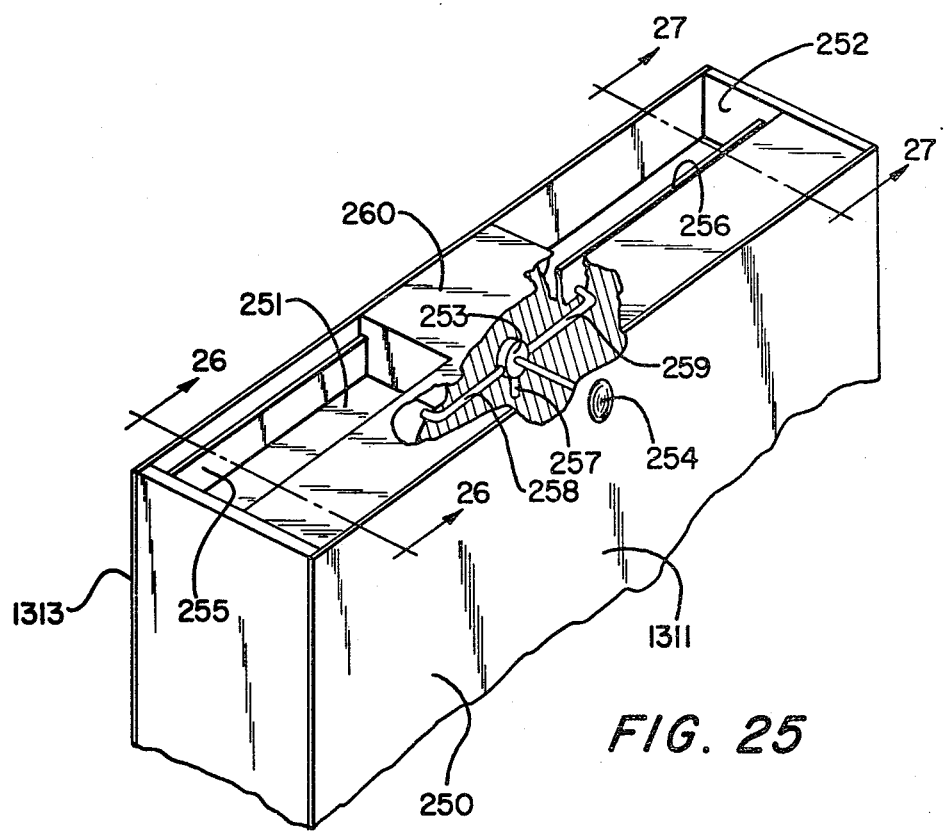
FIG. 25 is a perspective view of the top portion of a summer/winter panel.

The panel 250 shown in FIG. 25 is an adaptation of the panel of FIG. 13 to allow it to be used as a "winter" panel or a "summer" panel by a simple valve control.

The reversing of the diode's preferential heat transfer direction can also be effected by a single liquid valve with proper manipulation of interacting elements. FIG. 25 shows only the upper part of the panel, the lower portion being the same as the panel of FIG. 13. The upper portion of the panel is divided into two control regions; diode region 251 functions in the winter as in the panel of FIG. 13, whereas diode region 242 functions in the summer. Three-way valve 253, which is manually controlled by knob 254, connects the storage liquid 134 through passage 258 to either the large area portion 255 of diode region 251 for winter operation or through pasage 259 to the small area portion 256 of diode region 252 for summer operation. Valve 253 is also connected by passage 257 to storage liquid 134.

Figure 26:
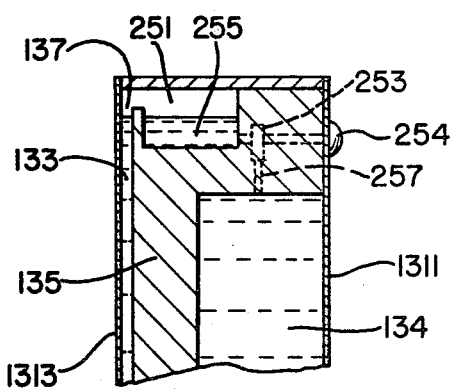
FIG. 26 is a cross-sectional view taken along section lines 6—6 of FIG. 25.

A cross-sectional view of panel 250 along section 6—6 is shown in FIG. 26. This view shown the "winter" control region 251 which is connected to stoage liquid 135 by valve 253 for winter-time operation of the panel 250. When the valve 253 is in this position, region 252 is blocked by the closed portion of valve 253 and has no function in the operation of panel 250 even though sensor liquid 133 is not blocked from region 252.

Figure 27:
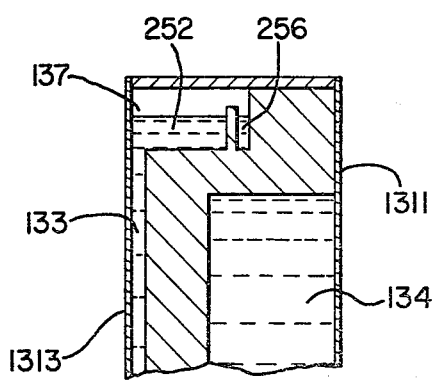
FIG. 27 is a cross-sectional view taken along section lines 7—7 of FIG. 25.

FIG. 27 shows a cross-sectional view of panel 250 taken along section lines 7—7 and shows the "summer" control region 252, which is connected to storage liquid 134 by valve 253 for summertime operation of the panel. In this situation, region 255 is blocked from storage liquid 134.

The central portion of the top of the panel is an insulator 260 which physically separates and thermally isolates the winter and summer control regions of the panel.

Figure 28:
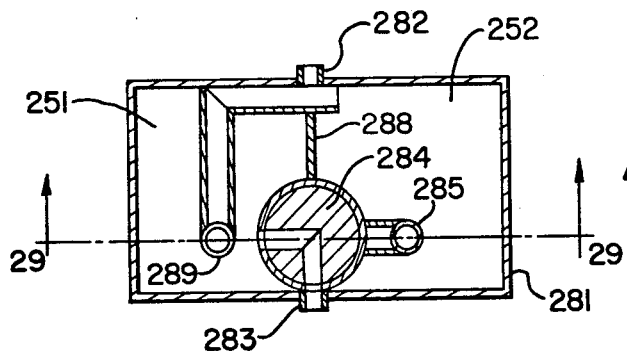
FIG. 28 is a cross-sectional view of the control box taken along section lines 8—8 of FIG. 29.
Figure 29:
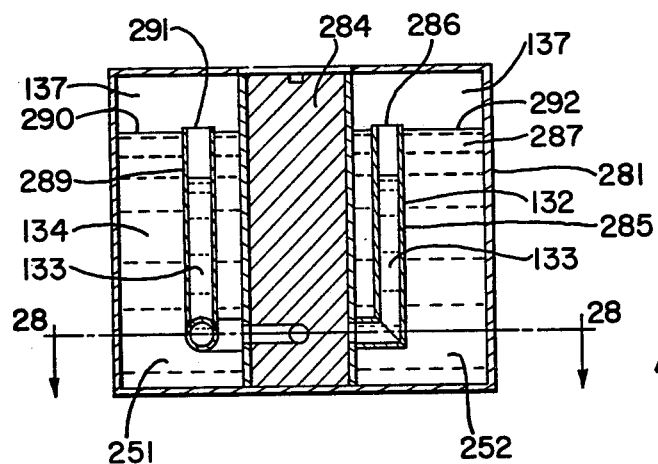
FIG. 29 is a cross-sectional view of the control box taken along section lines 9—9 of FIG. 28.

It will be apparent that the configuration of the valve 253 and the winter and summer diodes 251, 252 may assume other configurations than that shown in FIG. 25. FIGS. 28, 29 show, in cross-sectional views taken along sections 8 of FIG. 29 and 9 of FIG. 28, respectively, an embodiment wherein the valve 284, the summer diode 252 and the winter diode 251 are contained within a control box 281. The control box 281 is placed at the top of the panel 300, shown in cross section in FIG. 30. Ports 281, 283 connect the control box to the sensor liquid 133 and storage liquid 132, respectively, as shown in FIG. 30.

Control box 281 is divided into two sections by an insulating divider 288 to provide either the winter diode 251 or the summer diode 252 by rotary selection of the position of the three-way valve 284. FIG. 28 shows the valve 284 in a position where winter diode action is obtained since the storage liquid 134 has a large area 290 in the winter diode, whereas the sensor liquid 133 has only the small area 291 of pipe 289. If valve 284 is rotated through ninety degrees counterclockwise, the storage liquid 134 is connected to pipe 285 having the small area 286 whereas the sensor liquid 133 has the large area 292 to result in a winter diode. It is preferable to construct the control box 281 and its pipes 289, 285 and valve 284 of thermally insulating material to reduce heat transfer between liquid 134, 133 where the diodes are in the "off" condition.

The liquid levels in the winter diode section 251 as shown in FIG. 209 are those which exist when the panel is not convecting the liquid 134 as on a cold winter night. The liquid level in the summer diode section 252 shows the levels of the liquids 133, 134 which existed at the time that the valve was changed to the winter diode state.

Figure 30:
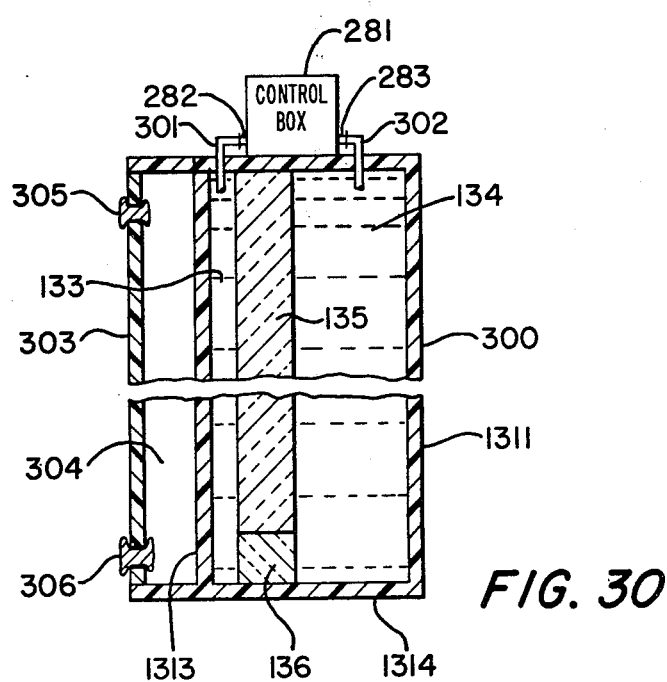
FIG. 30 is a cross-sectional view of a winter/summer panel having a control box and glazing.

The design of the winter/summer diodes within one box has the advantage that this unitized construction allows the panel 300 to otherwise have a very simple structure such as shown in the cross-sectional view of FIG. 30. The control box 281 is seen to be physically separate, from panel 300, being connected to the panel only by pipes 301, 302. Pipe 301 connects the sensor section of the panel to port 282 of the control box in order to provide a flow path for sensor fluid 134. Pipe 302 provides the same function for the flow of storage fluid 133 between the storage section of the panel and port 283.

In the operation of the summer diode during a summer day, solar heating of the sensor layer liquid 133 reduces its density to less than that of the cool storage layer. The oil 137 floating on top of the summer diode 252 is drawn down into the inlet riser pipe 285, preventing a convection flow which would transmit the solar heat into the interior of the house. On a summer night, the sensor layer liquid 133 is cooled by convection and radiation to the night sky so that its density becomes greater than the density of the liquid 134 in the storage layer. Warmer storage liquid 134 bubbles up over the top of the inlet riser pipe 285 forming a convection loop which transmits heat into the sensor layer liquid 133. Cooled sensor liquid replaces the liquid in the storage layer through the return port 282. Summer diodes transmit heat out on a summer night better than they conduct heat in during a summer day.

Some northern climates (for example, Canada) require glazing for efficient solar heating. Glazing is the installation of a transparent cover over the outer surface of a solar collector. Radiant heat passes through the glazing and heats the collector surface. The air space between the glazing and the collector forms an insulating blanket which reduces convective heat losses on windy days. Furthermore, radiant heat losses are reduced by the "greenhouse effect." Glazing cam double the energy absorbed from the sun in the winter.

Originally, glazing was one or more layer of glass covering the collector surface. More recently however, glass has been replaced by thin sheets of plastic or fiberglass giving about the same efficiency. FIG. 30 shows glazing 303 used on a thermic diode panel 300. In the winter, the air space 304 increases the heat absorbed by the sun. In the summer, the dead air space must be filled with water for efficient heat dissipation. This involves filling the air space 304 through fill plug 305 with a garden hose each spring and draining the water through drain plug 305 each fall. Since air-conditioning is not as important in northern climates where glazing is needed, a glazed winter diode alone is often sufficient. No summer diode is used, but the winter diode is turned off during the summer months to reduce summer heat gain.

While particular embodiments of the invention are described hereinbefore, it will be apparent that various modifications can be made in the form and construction thereof without departing from the fundamental principles of the invention. It is, therefore, desired by the following claims to include within the scope of the present invention all similar and modified forms of the apparatus disclosed and by which the results of the invention can be obtained.

What is claimed is:

1. A method of controlling energy transmission between two close-spaced regions in a system, that comprises: confining a fluid in the space between the two regions; effecting natural convection flow of the fluid in one state in said space; and changing the rate of flow from that produced by said natural convection flow of the fluid in said one state, on the basis of a temperature parameter in the system, using only thermal energy directly transmitted to produce an effect internally of said space to thereby control the direction and/or the rate of fluid flow in said space by a mechanism other than the character of the fluid itself, said fluid, mostly by virtue of the convective properties of the fluid and without change from said one state thereof, acting to modulate the energy transmission between the two closely spaced regions of the system.

2. Apparatus for controlling energy transmission between two closely-spaced regions in a system that comprises: an isolating structure occupying a predetermined space between the two closely-spaced regions; fluid means disposed within such structure and confined to said predetermined space for maintaining fluid in one state and permitting natural convection flow thereof in response to a temperature differential between said regions; and control means responsive to a temperature parameter of the system for automatically changing the direction and/or rate of flow of the fluid in said one state from that otherwise induced by said temperature differential in said structure by a mechanism other than the character of the fluid itself; said fluid, mostly by virtue of the convective properties, using only thermal energy and without change from said one state thereof, acting to modulate the energy transmission between the two regions of the system, said control means being operative in response to an effect produced internally within the structure by thermal or radiation energy directly transmitted to at least one of said fluid and said control means.

3. Apparatus as claimed in claim 2 in which the isolating structure comprises: a container having two principal surfaces, a first liquid contained in said container, an insulator to partition said container into two sections each having said liquid in proximity to one of said surfaces, and in which the control means acts to control convective flow of said liquid between said two sections in response to said temperature parameter.

4. Apparatus as claimed in claim 2 in which the control means comprises bellows means, said temperature parameter being the absolute temperature at one of said regions.

5. Apparatus as claimed in claim 2 in which the temperature parameter is a combination of the absolute temperature of one of the two regions and the temperature differential between the two regions; in which the isolating structure comprises a thermal insulator interposed between the two regions and serving to divide the isolating structure into a first section adjacent one region of the two regions and a second section adjacent the second region of the two regions, said fluid being a liquid adapted to flow by convective flow from one to the other of the two sections in response to a temperature differential between the two regions, said liquid being chosen to congeal, freeze or thicken at a predetermined control temperature; and in which the control means comprises a block having passages or holes through which the liquid can pass by virtue of convective flow when in the liquid state but which act to block or constrain convective flow of the liquid as it congeals, freezes or thickens.

6. A thermal summing junction panel that comprises a plurality of individual units, each unit comprising apparatus for controlling energy transmission as claimed in claim 1.

7. Apparatus as claimed in claim 2 wherein said control means comprises a plurality of individual control units, each control unit or all the control units acting in the manner defined by claim 1 to control energy transmission.

8. The apparatus of claim 2 wherein said isolating structure comprises, a flexible closed container for confining said fluid, heat transmissive plates in thermal contact with said closely spaced regions and in thermal contact with said fluid means, said container expanding or contracting in response to said temperature parameter to affect said natural convection.

9. Apparatus as defined in claim 2, wherein said fluid means includes a thermal insulator permitting the structure internally to form fluid conducting passages through which said natural convection flow is circulated.

10. Apparatus as defined in claim 9, wherein said control means is operative to control by blocking and unblocking said natural convection flow between said passages.

11. Apparatus as defined in claim 2, wherein said fluid means includes two different fluids disposed within said structure, said control means being operative to change said natural convection flow by varying the quantity of one fluid with respect to the other.

12. Apparatus as defined in claim 11, wherein said fluids are separated from each other by density differences or surface tension therebetween.

13. The combination of claim 1 wherein said isolating structure comprises a pair of heat conducting plates, and an insulating frame for holding said plates in physical contact with each other, said fluid means including a heat insulating gas contained within said structure, and a thermally convective liquid confined between said plates, said control means causing an increase in gas pressure acting to force said plates apart and thereby form a thermally insulated gas-filled gap between such plates.

14. The apparatus as in claim 13 wherein said means responsive to a temperature source comprises
  a flexible closed container,
  a fluid contained within said container,
  a heat transmissive plate in thermal contact with the fluid and the temperature source,
  said container expanding with an increase in the temperature of the source and fluid,
  the container being in contact with the gas to cause the gas pressure to increase when the container expands.

15. The combination of claim 1 wherein said isolating structure comprises a pair of heat conduction plates spaced apart by an insulating frame, and a thermal insulator contained between said plates, said fluid means including a thermally convective liquid said control means acting to press said insulator against one of the plates to prevent heat transfer from the liquid to that plate and force the insulator away from said plate to allow the liquid to contact that plate to convectively transfer heat through the liquid on both sides of the insulator from that plate to the other plate.

16. The apparatus of claim 15 wherein said means responsive to a temperature source comprises
  a flexible closed container,
  a fluid confined within said container, a heat-transmissive plate in thermal contact with the temperature source and in thermal contact with the fluid, said container expanding with an increase in the temperature of the source and fluid, said container pushing said slab away from said plate when it expands.

17. Apparatus as claimed in claim 2 in which the temperature parameter is the temperature differential between the two regions; in which the isolating structure comprises a thermal insulator interposed between the two regions and serving to divide the isolating structure into a first section adjacent one region of the two regions and a second section adjacent the second region of the two regions, said fluid being a liquid adapted to flow by convective flow from one to the other of the two sections in response to a temperature differential between the two regions; and in which the control means comprises a valve that includes float means having near neutral buoyancy with respect to the liquid so that the float will move within the liquid as a function of the temperature of the liquid around the float, thereby to close and open the valve as a function of the temperature of the liquid around the float to control said convective flow.

18. Apparatus as claimed in claim 17 in which the float is an insulating float.

19. Apparatus as claimed in claim 17 that further includes porous insulation between the first section and the second section through which the liquid must flow.

20. Apparatus as claimed in claim 1 in which the isolating structure comprises: a pair of heat conducting plates spaced apart by an insulating frame, a thermal insulator disposed between said plates, said fluid means including a thermally convective liquid, said control means including means for confining said thermally convective liquid between said plate to occupy the space between the plates not occupied by the insulator, and means for pressing said insulator against one of the plates to prevent heat transfer from the liquid to that plate; and in which the control means acts to press against said insulator to force it away from said plate to allow the liquid to contact that plate to extract heat therefrom and convectively to transfer the heat between the pair of conducting plates.

21. The apparatus of claim 20 wherein said control means is responsive to a temperature source and further includes a flexible closed container, a fluid confined within said container, a heat-transmissive plate in thermal contact with the temperature source and in thermal contact with the fluid, said container expanding with an increase in the temperature of the source and fluid, said container pushing said insulator away from said plate when it expands.

22. Apparatus as in claim 21 in which the flexible closed container is a bellows.

23. The combination of claim 1 wherein said fluid means includes a liquid, and means for thermally insulating said liquid into two portions, each portion being in thermal contact with a different side of the structure to induce natural convective flow between the two portions in response to a change in temperature of one liquid portion, said control means including valve controlling means.

24. The panel of claim 23 wherein said controlling means comprises a valve comprising a seat and a float to close said valve when said float exerts positive buoyancy pressure against the seat, said valve being located in the liquid portion whose temperature is to be controlled, said valve allowing convective flow between said portions when the temperature of liquid portion containing the valve is above the temperature at which the float has positive buoyancy.

25. The panel of claim 23 wherein said controlling means comprises a temperature controlled valve comprising
a bellows containing a liquid,
a valve mechanically attached to said bellows to open when the temperature of the liquid in the bellows is at its vapor transition temperature,
said valve when open allowing one portion of said liquid to flow into the other,
said bellows being contained in one portion of said liquid,
a permeable insulator separating said portions,
said valve and said permeable insulator being so located in said panel that where said valve is open there will be convective flow from one liquid to the other through the valve and permeable insulator.

26. The panel of claim 23 wherein said controlling means comprises,
a flap valve located in the region where the two liquid portions are proximate and separating said portions when closed,
a permeable insultor separating the two liquid portions at the other region of their proximity,
said flap valve allowing convective flow between the two portions when the temperature difference of the two portions is such that the convective flow is in the direction which opens said flap valve.

27. The panel of claim 23 wherein said controlling means comprises,
a temperature controlled valve comprising,
a bellows containing a liquid,
a valve mechanically attached to said bellows to close when the temperature of the liquid in the bellows is at its vapor transition temperature,
said valve when closed separating one boundary of the two liquid portions,
said bellows being contained in one portion of said liquid,
a permeable insulator separating the liquid portions at their other boundary,
when said valve is open convective flow occurs between said liquid portions through said valve and permeable insulator.

28. The panel of claim 23 wherein said controlling means comprises,
a bubble of immiscible fluid whose size depends on its temperature located in a passage between the two liquid portions,
the size of said bubble being sufficient to close off the passage when its temperature is sufficiently high,
means for transferring heat to said bubble to change its temperature,
a permeable insulator separating the liquid portions at their other boundary,
whereby a convective flow will be possible between said liquid portions when the temperature of the bubble is below the valve at which the passage is closed.

29. The panel of claim 23 wherein said controlling means comprises,
   a trap containing an immiscible material which is a liquid at a temperature at which convective flow between the liquid portions is desired and is very viscous material at a lower temperature,
   said trap separating the two liquid portions when the material is very viscous,
   a permeable insulator separating the liquid portions at their other boundary,
   whereby a convective flow will be possible through said trap and permeable insulator when the temperature of the material in the trap is at a temperature when the material in the trap is a liquid.

30. The panel of claim 23 wherein
   said liquid contains a material which is in solutions when the temperature of the liquid is below the precipitation temperature so that convective flow between the liquid portions may occur if one portion is at a temperature difference with respect to the other,
   said material precipitating out of solutions when the temperature of a liquid portion is above the precipitation temperature to block the convective path of said liquid portions.

31. Apparatus as claimed in claim 2 in which the temperature parameter is the temperature differential between the two regions and in which the isolating structure comprises: a thermal insulator interposed between the two regions and serving to divide the isolating structure into a first section adjacent one region of the two regions and a second section adjacent the second region of the two regions, said fluid being a low viscosity liquid that is adapted to flow by convective flow from one to the other of the two sections in response to said temperature differential.

32. Apparatus as claimed in claim 31 in which the control means acts to affect primary heat transfer from the first of the two regions to the second of the two regions during one period of time and acts to affect primary heat transfer from the second of the two regions to the first of the two regions during another period of time.

33. Apparatus as claimed in claim 32 in which the control means comprises liquid valve means that permits unidirectional convective flow of the liquid in one direction during the the first period of time and unidirectional convective flow of the liquid in the opposite direction during the second period of time.

34. Apparatus as claimed in claim 31 that includes a thermally conductive separator in the first section dividing the section into two spaces, one of the two spaces containing a liquid in direct thermal contact with said one region and the second of the two spaces containing a liquid convectively coupled to the liquid in said one of the two spaces as well as with the liquid in said second section.

35. Apparatus as claimed in claim 34 in which the control means comprises liquid valve means that includes a second liquid having a density that differs slightly from that of the first-named liquid and is immiscible therein, the second liquid being disposed between the first section and the second section to affect the convective flow of the first-named liquid.

36. Apparatus as claimed in claim 35 that includes a thermally insulating separator in the first section dividing the section into two spaces, one of the two spaces containing the liquid in direct thermal contact with said one region and the second of the two spaces being convectively coupled through thermally-actuated valve means with said one of the two spaces.

37. Apparatus as claimed in claim 36 in which the thermally-actuated valve means comprises a channel at the lower part of the thermally insulating separator to permit convective flow of the liquid between the two spaces and bellows means that acts to regulate convective flow of the liquid therethrough.

38. Apparatus as claimed in claim 2 in which the isolating structure comprises a thermal insulator interposed between the two regions and serving to divide the isolating structure into a first section adjacent one region of the two regions and a second section adjacent the second region of the two regions, said fluid being a liquid adapted to flow by convective flow from one to the other of the two sections and in which the control means acts to affect said convective flow.

39. Apparatus as claimed in claim 38 in which the temperature parameter is a temperature difference between the two regions, the control means being responsive to said temperature difference and acting in response thereto to regulate said convective flow.

40. Apparatus as claimed in claim 39 in which the isolating structure is a vertically oriented panel, in which the thermal insulator is a vertically oriented insulator having a passage at the lower end thereof through which the liquid can flow, said control means comprising said passage and bellows actuated valve means that is actuated in response to said temperature difference to regulate the convective flow of the liquid through the channel.

41. Apparatus as claimed in claim 38 in which the isolating structure is oriented so as to have a vertical component of orientation, in which the thermal insulator is impenetrable to the liquid at all portions thereof except at its top or upper portion and its bottom or lower portion, one of the upper portions and the lower portions being selective in permitting the liquid to pass through the particular portion.

42. Apparatus as claimed in claim 41 in which the control means comprises valve means disposed at the one portion to render said one portion selective in permitting liquid to flow therethrough and thereby affect the said convective flow.

43. Apparatus as claimed in claim 42 in which the valve means includes a trap located at one end of the thermal insulator and containing a substance which changes from a liquid to a solid within a range of temperatures within which the panel operates, said substance, when in the liquid state, having a density that is different from the liquid that flows between the two sections and which in the solid state has a density that is either less than or greater than that of the liquid that flows between the two sections.

44. Apparatus as claimed in claim 42 in which said valve means comprises a bubble of an immiscible fluid whose size changes with temperature to regulate said convective flow.

45. Apparatus as claimed in claim 42 in which said valve means comprises a passage in the said one portion and further includes a thin flap associated with the passage and co-acting therewith to permit said convective flow to occur in one direction through the thermal insulation at said one portion but to prevent convective flow in the opposite direction.

46. Apparatus as claimed in claim 42 in which the valve means comprises a trap operatively disposed to regulate said convective flow, said trap containing a substance that is immiscible in the liquid that flows between the two sections.

47. Apparatus as claimed in claim 46 in which said substance changes state from liquid to solid and vice versa within the operating temperature range of said panel.

48. Apparatus as claimed in claim 42 in which the valve means is liquid valve means.

49. Apparatus as claimed in claim 48 wherein the liquid valve means comprises a second liquid immiscible in the first-named liquid and having a density that differs slightly from the first-named liquid, the second liquid being disposed in the path of said convective flow of the first-named liquid from one to the other of the two sections and to permit said flow in one direction but to restrict the flow in the other direction.

50. Apparatus wherein liquid valve means as claimed in claim 49 is provided at both the top or upper portion of the thermal insulator and the bottom or lower portion thereof and in which means is provided to render the liquid valve means at one said portion inactive during one period of time and the other inactive during another period of time to provide a summer-winter isolating structure or a day-night isolating structure as the case may be.

51. Apparatus as claimed in claim 50 that includes means to render the liquid valve means at the top or upper portion of the thermal insulator inactive and active and further means to render the liquid valve means at the bottom or lower portion of the thermal insulator inactive and active.

52. A convective-flow heat-transfer panel comprising a container having two principal surfaces, a first liquid contained in said container and maintained therein in the liquid state, an insulator to partition said container into two sections, each having said liquid in proximity to one of said surfaces, means for changing natural convective flow of said liquid in direction and/or rate between said two sections by a mechanism other than the character of the liquid itself in response to the temperature of a temperature source directly transmitting heat energy internally of the panel.

53. A thermal energy heat transmission panel comprising: means for thermally heating a first liquid, means using only thermal energy and without change from said one state thereof, acting to modulate the energy transmission between the two regions of the system, said control means being operative in response to an effect produced internally within the structure by thermal or radiation energy directly transmitted to at least one of said fluid and said control means.

54. The panel of claim 1 comprising in addition
a third liquid of less density than said first and second liquids and immiscible therewith,
said third liquid floating on the surfaces of said first and second liquids,
when the temperature of the first liquid causes its height to exceed the top of the insulator, the first liquid flows through the third liquid into the second liquid.

55. The panel of claim 54 wherein
said first and second liquids are water, and
said third liquid is an oil.

56. The panel of claim 54 wherein
said means for controlling convective flow comprises in addition,
a fourth liquid occupying the bottom of said container,
said fourth liquid has a density greater than that of the first liquid contained in said container and is immiscible therewith,
said insulator being inserted into said second liquid to cause the topmost surface of the second liquid to divide into two parts, one of which is greater in surface area than the other,
the second liquid in the container extending over the top of said insulator,
a second permeable insulator in and near the bottom surface of said second liquid to block conductive heat transfer between the second and fourth liquids,
whereby a temperature increase of the liquid in the section having the lesser surface area will cause convecting flow of said second liquid from said section through said first liquid to the other section whereas the same temperature increase of the liquid in the section having the greater surface area will not cause convective flow,
and means for controlling the levels of the liquids to determine the direction of heat transfer through the panel.

57. The panel of claim 54 comprising in addition
a heat conductive separator separating the second liquid into two portions,
a smaller portion being in contact with the separator and capable of convectively transferring heat to the separator from the first liquid,
the larger portion being in thermal contact with the separator and an exterior wall of said panel and convectively transferring heat from the separator to the wall,
said smaller portion and said first liquid containing an ingredient to lower the freezing point of said liquids.

58. The panel of claim 54 comprising in addition
a second insulator separating said second liquid into a fourth and fifth liquids,
said second insulator having a permeable insulator and a valve in the convective path of said fourth and fifth liquids,
said fourth liquid being between the two insulators,
said fifth liquid being in contact with the second insulator and a wall of the panel,
said valve being thermally controlled to close by the temperature of the fifth liquid when the temperature increases to the valve-closing temperature so that the convection path is closed.

59. The panel of claim 54 comprising in addition
a control box divided into two sections,
said first and second liquids each being provided to each section of the control box,
the ratio of the surface areas of the two liquids being reversed in the two sections,
a valve for shutting off the flow of either liquid to one section while allowing flow of the same liquid to the other section.

60. The panel of claim 53 comprising in addition
means for providing said first liquid to have a larger surface area than said second liquid,
means for selecting the relative surface area of the first and second liquids between which liquid flow can occur.

61. The panel of claim 60 comprising in addition
glazing covering a surface of the panel, said glazing having a space between it and the surface of the panel, means for changing the thermal transfer between the surface of the panel and the glazing.

62. The panel of claim 61 wherein said thermal transfer changing means comprises
   means for providing a thermally conductive liquid in the space between said glazing and said surface, and
   means for removing said liquid.

* * * * *

UNITED STATES PATENT AND TRADEMARK OFFICE
CERTIFICATE OF CORRECTION

PATENT NO. : 4,137,964

DATED : February 6, 1979

INVENTOR(S) : BRUCE S. BUCKLEY

It is certified that error appears in the above-identified patent and that said Letters Patent are hereby corrected as shown below:

Column 16, line 2, change "1" to -- 2 --;
          line 32, change "1" to -- 2 --;
          line 53, change "1" to -- 2 --.
Column 17, line 31, change "1" to -- 2 --;
          line 58, change "1" to -- 2 --.
Column 21, lines 46-52, cancel "using only thermal energy and without change from said one state thereof, acting to modulate the energy transmission between the two regions of the system, said control means being operative in response to an effect produced internally within the structure by thermal or radiation energy directly transmitted to at least one of said fluid and said control means", and replace by -- for storing a second liquid cooler than said first liquid, said liquids being confined and maintained in the liquid state within the panel, a thermal insulator separating said first and second liquids, said first liquid having a smaller surface area than said second liquid, the height of said second liquid being less than the height of said insulator, the height of said first liquid exceeding the height of said insulator when the temperature of the first liquid is sufficiently high to cause said first liquid to flow over the top

UNITED STATES PATENT AND TRADEMARK OFFICE
CERTIFICATE OF CORRECTION

PATENT NO. : 4,137,964
DATED : February 6, 1979
INVENTOR(S) : BRUCE S. BUCKLEY

It is certified that error appears in the above-identified patent and that said Letters Patent are hereby corrected as shown below:

of the insulator into the second liquid in order to change the direction and/or rate of flow of the liquids by a mechanism other than the character of the liquids themselves, a liquid permeable insulator near the bottom of said insulator to allow the second liquid flow by natural convection into the first liquid when said first liquid is flowing into said second liquid over the top of the insulator, said first and second liquids being the same kind of liquid --;

line 53, change "1" to -- 53 --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,137,964
DATED : February 6, 1979
INVENTOR(S) : B. SHAWN BUCKLEY

It is certified that error appears in the above—identified patent and that said Letters Patent are hereby corrected as shown below:

COLUMN 1, after title of the invention, add:

--GOVERNMENT RIGHTS

The Government of the United States of America has rights in this invention under an agreement that is based on National Science Foundation Grant Do. GI-43897 to the Massachusetts Institute of Technology.--

Signed and Sealed this

Twenty-fourth Day of June 1980

[SEAL]

Attest:

SIDNEY A. DIAMOND

Attesting Officer   Commissioner of Patents and Trademarks

Disclaimer 4,137,964.—*Bruce S. Buckley*, Cambridge, Mass. CONTROLLABLE HEAT TRANSMISSION APPARATUS. Patent dated Feb. 6, 1979. Disclaimer filed Aug. 28, 1981, by the assignee, *Chevron Research Co.*

The term of this patent subsequent to Sept. 27, 1994, has been disclaimed.
[*Official Gazette December 22, 1981.*]